US010827355B2

(12) United States Patent
Lekkas et al.

(10) Patent No.: US 10,827,355 B2
(45) Date of Patent: Nov. 3, 2020

(54) SYSTEMS AND METHODS FOR RELIABLY PROVIDING A CONTROL CHANNEL FOR COMMUNICATING CONTROL INFORMATION WITH AUTOMOTIVE ELECTRONIC CONTROL UNITS

(71) Applicant: Auton, Inc., Snoqualmie, WA (US)

(72) Inventors: Panayotis Lekkas, Worcester, MA (US); Robert Foster, Seattle, WA (US)

(73) Assignee: Auton, Inc., Snoqualmie, WA (US)

( * ) Notice: Subject to any disclaimer, the term of this patent is extended or adjusted under 35 U.S.C. 154(b) by 326 days.

(21) Appl. No.: 15/857,212

(22) Filed: Dec. 28, 2017

(65) Prior Publication Data
US 2019/0208420 A1 Jul. 4, 2019

(51) Int. Cl.
*H04W 12/08* (2009.01)
*B60R 16/023* (2006.01)
(Continued)

(52) U.S. Cl.
CPC ......... *H04W 12/08* (2013.01); *B60R 16/0239* (2013.01); *H04L 67/125* (2013.01);
(Continued)

(58) Field of Classification Search
CPC . H04B 7/18506; B60K 31/0058; H04L 67/12; G06F 21/35
(Continued)

(56) References Cited

U.S. PATENT DOCUMENTS 5,815,071 A * 9/1998 Doyle ................ B60K 31/0058
340/439
6,084,870 A * 7/2000 Wooten .................. G08G 1/127
340/425.5
(Continued)

FOREIGN PATENT DOCUMENTS

EP 3306891 A1 4/2018

OTHER PUBLICATIONS

Panasonic. Telematic Control Unit and Smart Antenna Module. (2017). Retrieved from https://www.panasonic.com/global/business/p-its/pdf/montreal_2017/03_Telematic_Control_Unit_and_Smart_Antenna_Module.pdf.
(Continued)

*Primary Examiner* — Bryan F Wright
(74) *Attorney, Agent, or Firm* — Norton Rose Fulbright US LLP

(57) ABSTRACT

Systems and methods which provide reliable and resilient control channels for communicating control information with vehicle onboard systems using a control channel plane supporting migration of a control channel among various networks forming the control channel plane are described. The control channel plane of embodiments includes at least one data delivery network of a data network and at least one out-of-band network of a security network. Embodiments introduce an in-vehicle system into vehicles facilitating secure data communication between a centralized mobility management platform and the vehicles using a data network for data content communication and a security network for
(Continued)

security enhancement with respect to the data network. The centralized mobility management platform and IVS may utilize the aforementioned control channel for control signaling with respect to such operations, wherein the control channel is migrated between various networks of the control channel plane to provide a reliable and resilient control channel.

34 Claims, 5 Drawing Sheets

(51) Int. Cl.
  *H04W 4/44* (2018.01)
  *H04L 29/08* (2006.01)
(52) U.S. Cl.
  CPC ............. *H04W 4/44* (2018.02); *B60R 16/023* (2013.01); *H04L 67/12* (2013.01)
(58) Field of Classification Search
  USPC .......................................................... 726/4
  See application file for complete search history.

(56) References Cited

U.S. PATENT DOCUMENTS

| | | | |
|---|---|---|---|
| 7,356,832 B1* | 4/2008 | Eibach | B60R 25/00 701/31.4 |
| 9,432,929 B1 | 8/2016 | Ross et al. | |
| 2007/0130469 A1* | 6/2007 | Alrabady | H04L 9/12 713/178 |
| 2009/0086978 A1 | 4/2009 | McAvoy et al. | |
| 2009/0103452 A1* | 4/2009 | Horvath | H04B 7/18506 370/254 |
| 2015/0052352 A1* | 2/2015 | Dolev | H04W 12/06 713/156 |
| 2016/0072781 A1* | 3/2016 | Zhang | H04L 63/065 726/4 |
| 2016/0344705 A1* | 11/2016 | Stumpf | H04L 67/12 |
| 2017/0093866 A1* | 3/2017 | Ben-Noon | G06F 21/35 |
| 2018/0241584 A1* | 8/2018 | Ruvio | H04L 12/40013 |
| 2019/0190703 A1* | 6/2019 | Lekkas | H04W 12/0023 |

OTHER PUBLICATIONS

Klinedinst, D. & King, C. (2016). On board diagnostics: Risks and vulnerabilities of the connected vehicle [White paper]. Retrieved Jun. 13, 2018, from Carnegie Mellon University Software Engineering Institute: https://resources.sei.cmu.edu/asset_files/WhitePaper/2016_019_001_453877.pdf.

Ellison, R., Householder, A., Hudak, J., Kazman, R., & Woody, C. (2015). Extending AADL for security design assurance of cyber-physical systems [Technical Report CMU/SEI-2015-TR-014]. Retrieved Jun. 13, 2018, from Carnegie Mellon University Software Engineering Institute: https://resources.sei.cmu.edu/asset_files/TechnicalReport/2015_005_001_449522.pdf.

* cited by examiner

SYSTEMS AND METHODS FOR RELIABLY PROVIDING A CONTROL CHANNEL FOR COMMUNICATING CONTROL INFORMATION WITH AUTOMOTIVE ELECTRONIC CONTROL UNITS

CROSS-REFERENCE TO RELATED APPLICATIONS

The present application is related to U.S. patent application Ser. No. 15/845,859, filed Dec. 18, 2017 and entitled, "SYSTEMS AND METHODS FOR USING AN OUT-OF-BAND SECURITY CHANNEL FOR ENHANCING SECURE INTERACTIONS WITH AUTOMOTIVE ELECTRONIC CONTROL UNITS," the disclosure of which is incorporated by reference herein in its entirety.

TECHNICAL FIELD

The present invention relates generally to automotive systems and, more particularly, to control channels for communicating control information with automotive electronic control units.

BACKGROUND OF THE INVENTION

Modern vehicles contain a multitude of onboard systems, such as may comprise electronic control units (ECU), vehicle-based entertainment systems, global positioning system (GPS) location determination systems, etc. Such onboard systems may comprise a processor-based system having a processor and memory, as well as typically some form of interface to vehicle components and/or occupants, and thus may each effectively operate as an autonomous computer responsible for controlling some aspect of functionality within the vehicle. For example, ECUs may control critical vehicle operations such as fuel injection, emissions, throttle, transmission, exterior lighting, braking, and traction systems, vehicle safety systems such as supplemental restraint systems (e.g., air bag, seat belts, or other safety devices), cruise control, and blind spot monitoring. Other onboard systems may control comfort systems such as, climate control, audio, and video.

As with many other electronic system, onboard systems may benefit from data (e.g., software, firmware, operational or configuration parameters, or other control instructions) updates from time to time. The delivery of ECU data updates and providing for their proper installation is particularly important considering the dangerous potential of malfunctioning vehicles and the amount of time a particular vehicle may remain in service. Vehicle manufacturers may provide onboard system data updates as a part of a recall, to improve existing features, to provide expanded functionality, to prolong the service life of the vehicle, etc. Presently, a vehicle owner can securely obtain authorized ECU data updates by taking the vehicle to a dealership or mechanic affiliated with the vehicle's manufacturer. However, it may be months or even years after the vehicle manufacturer has released a particular data update before the owner takes the vehicle to the dealership or mechanic. The vehicle owner may not even know that new data updates for one or more onboard system of the vehicle exists. Even if the owner regularly takes the vehicle to the dealership or mechanic for routine maintenance, there may be a gap in time from when the vehicle manufacturer released the data updates and when the vehicle next visits the dealership or mechanic.

Additionally, various benefits may be realized from onboard systems providing data reports and other information from time to time. For example, an ECU may monitor one or more vehicle sensor useful in detecting malfunction or impending failure of a vehicle component, diagnosing vehicle malfunctions, monitoring maintenance cycles, etc. Presently, data is typically retrieved from ECUs through the use of a data link connector (DLC), such as an on-board diagnostics (OBD) port. For example, a mechanic or other individual may physically connect a data scanner to the vehicle OBD port to retrieve data from one or more ECU operable in the vehicle.

Some vehicles have wireless data delivery capability, such as through use of an on-board cellular radio and the cellular telephony network (e.g., the UNSTAR™ system available on some General Motors™ vehicles), through which an onboard system may transmit and receive some limited data (e.g., receive a remote vehicle start command, receive a remote door unlock command, transmit a vehicle status report, and transmit a vehicle location report). Such systems typically provide relatively simple on-demand data links, employing conventional cellular communications protocols for establishing a data link and providing handovers between stations to maintain a data link during a communication session. When the vehicle is operated outside of the cellular telephony network's data delivery area, or is operated outside of a cellular telephone network mobile network provider system to which the on-board cellular radio is subscribed, wireless data communication is not supported with the vehicle. Moreover, update data for critical onboard systems, such as ECUs, are vulnerable to malicious attack and thus such data updates are not supported by these wireless data delivery systems.

BRIEF SUMMARY OF THE INVENTION

The present invention is directed to methods and systems which provide reliable and resilient control channels for communicating control information with onboard systems, and in particular ECUs, using a control channel plane supporting migration of a control channel for a vehicle among various in-band and out-of-band networks forming the control channel plane. In accordance with embodiments, a data network may be used for data content communication (e.g., protected data delivery) between a centralized mobility management platform and a vehicle, and a security network providing security token communication between the centralized mobility management platform and the vehicle may be used for enhanced security for the data content communication. The data network may comprise a plurality of data delivery networks while the security network may comprise one or more out-of-band networks with respect to the plurality of data delivery networks. The control channel plane of embodiments includes at least one data delivery network of a data network at least one network that is in-band with respect to the band or bands used for data content communication flow) and at least one out-of-band network of a security network (i.e., at least one network that is out-of-band with respect to the band or bands used for data content communication flow).

Embodiments of the present invention introduce an in-vehicle system (IVS) into vehicles of a fleet of vehicles (e.g., automobiles, trains, boats, ships, submarines, planes, rolling stock, transportation means, drones, robots, autonomous buoys, etc.) facilitating secure data communication between a centralized mobility management platform and the vehicles using the aforementioned data network for data content communication (e.g., protected data delivery) and the aforementioned security network for security enhancement with respect to the data network. Such an IVS may comprise one or more processors for controlling secure delivery of data to the vehicle, controlling data updates for one or more onboard system (e.g., ECUs) of the vehicle, controlling collecting data from one or more onboard systems of the vehicle, controlling reporting of data from the vehicle to the centralized mobility management platform, etc. The centralized mobility management platform and IVS may utilize the aforementioned control channel for control signaling with respect to such operations. For example, the control channel may be used to communicate communication environment information from the vehicle to the centralized mobility management platform, to communicate data delivery network selection information to the vehicle, etc.

In providing a reliable and resilient control channel, the centralized mobility management platform and IVS of embodiments cooperate to migrate a control channel established between the centralized mobility management platform and a vehicle and dynamically reassign such a control plane among networks of the data network and the security network included in the control channel plane. The migration of the control channel among the networks of the data network and the security network may, for example, be based upon control channel migration and dynamic reassignment rules applied by logic of the centralized mobility management platform to communication environment information provided by the IVS and network utilization information available to the centralized mobility management platform to maintain the control channel between the vehicle and the centralized mobility management platform. In operation according to embodiments, migration and dynamic reassignment of the control channel is independent of use of the data network for communicating data content between the centralized mobility management platform and the IVS and use of the security network for communicating security token information between the centralized mobility management platform and the IVS.

A control channel may be initially established between the centralized mobility management platform and a vehicle using any of one or more networks of the data network or the security network included in the control channel plane. In operation according to embodiments, the IVS may scan the networks of the data network and the security network included in the control channel plane and report control channel plane network availability information to the centralized mobility management platform. Control channel plane network selection rules applied by logic of the centralized mobility management platform may select a network of the data network included in the control channel plane or a network of the security network included in the control channel plane for initially establishing the control channel using the control channel plane network availability information reported by the IVS.

In operation according to embodiments, a control channel may be initially established between the centralized mobility management platform and a vehicle using one or more networks of the security network included in the control channel plane as a fallback control channel network. For example, control channel plane network selection rules applied by logic of the centralized mobility management platform may select a network of the security network included in the control channel plane for initially establishing the control channel when the control channel between the centralized mobility management platform and the vehicle has not been established and the centralized mobility management platform has control data for the vehicle. As another example, control channel plane network selection rules applied by logic of the centralized mobility management platform may select a network of the security network included in the control channel plane for initially establishing the control channel when the control channel between the centralized mobility management platform and the vehicle has not been established and the vehicle has not reported control channel plane network availability information to the centralized mobility management platform within a predetermined period of time.

Irrespective of what network of the control channel plane is used for initially establishing the control channel, the control channel may be migrated and dynamically reassigned among the various networks of the control channel plane (e.g., the in-band networks of the data network and the out-of-band networks of the security network forming the control channel plane) to provide a reliable and resilient control channel for communicating control information between a centralized mobility management system and a vehicle. The migration of the control channel among networks of the control channel plane may be dynamically controlled, such as through application of the aforementioned control channel migration rules, based upon various factors, such as may include geographic coverage, cost, network availability, network resource set, network congestion, network latency, bandwidth, signal and/or service quality, etc. Through establishing and dynamic migration of a control channel among the various in-band and out-of-band networks of the control channel plane, embodiments are able to resiliently and reliably provide command, control, and signaling communication between a centralized mobility management platform and vehicles of a fleet of vehicles.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same, purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
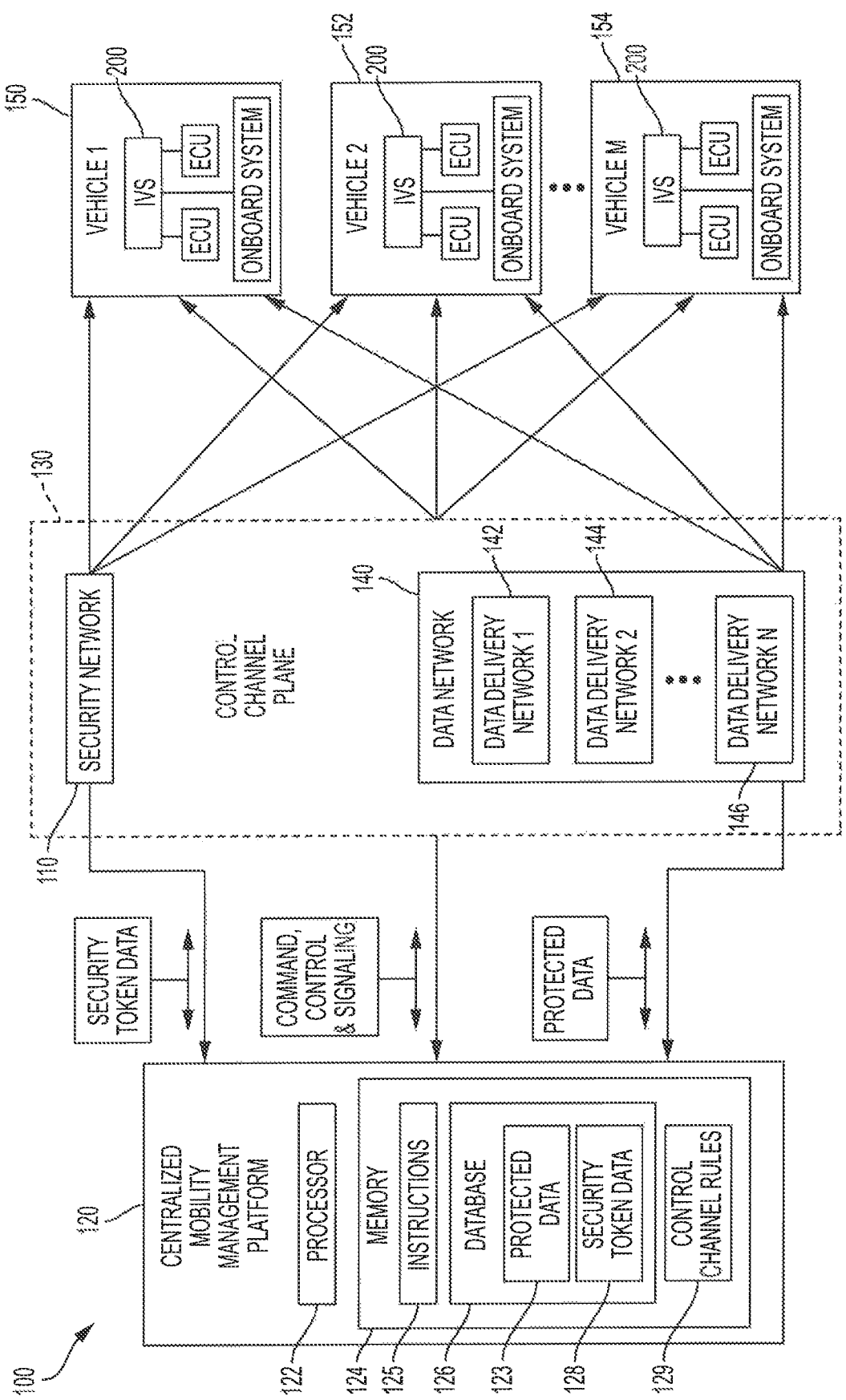
FIG. 1 shows a system configured to provide reliable and resilient control channels for communicating control information with onboard systems of vehicles in accordance with embodiments of the present invention.

FIG. 1 shows system 100 configured according to embodiments of the invention to provide reliable and resilient control channels for communicating control information with onboard systems of vehicles. The illustrated embodiment of system 100 includes centralized mobility management platform 120 communicatively coupled to vehicles 150-154 of a fleet of vehicles via a plurality of networks, including security network 110 and data network 140, as well as control channel plane 130.

Centralized mobility management platform 120 may, for example, provide a processor-based system operable to manage and control various protected data delivery operations with respect to the vehicles of a fleet of vehicles. Accordingly, centralized mobility management platform 120 of the illustrated embodiment comprises processor 122 and memory 124, wherein processor 122 is operable under control of one or more instruction sets (e.g., instructions 125, control channel rules 129, etc.) and/or using various data (e.g., data of database 126) to perform functionality as described herein. For example, centralized mobility management platform 120 may provide data for updating one or more onboard systems (e.g., ECUs) of one or more vehicles, entertainment content to one or more vehicles, etc. Additionally or alternatively, centralized mobility management platform 120 may provide various protected data collection operations with respect to the vehicles of the fleet of vehicles, such as to obtain sensor data, vehicle operation data, etc. Centralized mobility management platform 120 may, for example, comprise a system operated by or affiliated with a vehicle manufacturer for use in delivering protected data which is critical to the safe operation of vehicles of a fleet of vehicles produced by the manufacturer (e.g., delivery of ECU configuration data or operational code updates and providing for their proper installation). Additionally or alternatively, centralized mobility management platform 120 may comprise a system operated by a vehicle manufacturer or third party vendor operable to deliver data which is not critical to the operation of the vehicles, but nevertheless is provided some level of protection (e.g., navigation system update data, digital rights managed multimedia content, etc.).

Although shown in the illustrated embodiment as comprising a single processor-based system, it should be appreciated that centralized mobility management platform 120 of embodiments may comprise any number of processors and any number of systems (e.g., servers) among which the computational load can be distributed in support of design constraints like e.g. redundancy, fault-tolerance, potentially guaranteed computation performance, scalability, etc. For example, centralized mobility management platform 120 of embodiments may comprise one or more e911 servers (e.g., operable to provide emergency location determinations, detection and reporting of vehicles involved in emergency situations, etc.), status supervisor servers (e.g., providing sensing data collection, optimal content transmission/dispatch/routing decisions, analytics, operations/administration/management/provisioning (OAM&P) functionality, billing administration, network management and provisioning, network administration and maintenance, etc.), content distribution servers (e.g., operable to provide infotainment content distribution, return-link-based content-on-demand management, OBD data collection, etc.), security servers (e.g., providing security authentication, security management, threat and network security incident management, etc.), customer relationship management (CRM) servers (e.g., operable to provide customer relations management, customer business support, customer technical support and customer incident management, etc,), corporate servers (e.g., providing enterprise risk management (ERM), finance administration, accounting administration, procurement, legal, administration, human resource management, web site operation, load balancing, system supervisor operation, etc.), and/or the like.

Vehicles 150-154 may comprise vehicles of a particular fleet or group of vehicles for which communication of protected data is provided with respect to centralized mobility management platform 120. For example, vehicles 150-154 may comprise vehicles produced by a particular manufacturer, vehicles of a particular model, vehicles owned by a particular company or individual, etc. Although vehicles 150-454 are described with reference to automobiles in particular examples herein, it should be appreciated that vehicles of embodiments for which reliable and resilient control channels for communicating control information with onboard systems of the vehicles are provided may comprise automobiles, trains, boats, ships, submarines (e.g., when operating on the sea surface), planes, rolling stock, transportation means, drones, robots, autonomous buoys, etc., whether manned or autonomous. Irrespective of the particular form of vehicles 150-154, each vehicle of vehicles 150-154 of the illustrated embodiment includes an instance of in-vehicle system (IVS) 200 facilitating secure data communication between centralized mobility management platform 120 and the respective vehicle of vehicles 150-154 using data network 140 for data content communication and security network 110 for security enhancement with respect to the data network. IVS 200 (described in further detail below) may, for example, comprise one or more processors for controlling secure delivery of data to the vehicle, controlling data updates for one or more onboard system (e.g., ECUs) of the vehicle, controlling collecting data from one or more onboard systems of the vehicle, controlling reporting of data from the vehicle to the centralized mobility management platform, etc. Accordingly, system 100 of FIG. 1 includes security network 110 and data network 140 providing communication connections between centralized mobility management platform 120 and vehicles 150-154.

Data network 140 of embodiments may be used for protected data content communication between centralized mobility management platform 120 and any or all of vehicles 150-154 and may be comprised of one or more data delivery networks. For example, data network 140 of the illustrated embodiment is comprised of data delivery networks 142-146, such as may comprise terrestrial networks such as wired networks, wireless networks, local area networks (LANs), wireless LANs (WLANs), wide area networks (WANs), metropolitan networks (MANs), Wi-Fi networks, Worldwide Interoperability for Microwave Access (WiMAX) networks, public networks (e.g., the Internet), private networks, cellular broadband networks (e.g., LTE, CDMA2000, EDGE, etc.), multi-network mobile virtual network operator (MONO) networks, UHF ASC broadcast and/or multicast networks, other network infrastructures and topologies, and geostationary (GEO) satellite networks, such as Ku band satellite networks, Ka band satellite networks, and/or the like. One or more data networks of data delivery networks 142-146 may operate on different frequency bands (licensed and/or unlicensed) of the radio frequency spectrum, in different geographic coverage areas (overlapping and/or non-overlapping), with different networking protocols (e.g., TCP/IP, Space Communications Protocol Specifications (SCPS), IEEE 802.15.4, Bluetooth, etc.). Additionally or alternatively, one or more data delivery networks of data delivery networks 142-146 may provide different bandwidth (e.g., transfer speed, channel capacity, channel throughput, etc.), costs (e.g., data transmission charges, rerouting processing, etc.), quality (e.g., quality of service, capability to meet urgency requirements, data path, etc.), and geographic access to the vehicle fleet. It should be appreciated that, although 3 such data delivery networks are shown with respect to the illustrated embodiment of data network 140, embodiments of the present invention may comprise more or fewer data delivery networks. Irrespective of the particular number of data delivery networks comprising the data network, data network 140 of embodiments herein facilitates data communication (e.g., communication of protected data, such as protected data 123) between vehicles of vehicles 150-154 and centralized mobility management platform 120.

In addition to, and independent of, data network 140, security network 110 may be used for security token data communication between centralized mobility management platform 120 and any or all of vehicles 150-154, such as for enhanced security with respect to the protected data content communication. That is, security network 110 of embodiments comprises an out-of-band network with respect to data network 140. Security network 110 preferably provides broader geographic coverage than any individual data delivery network of data network 140. In some embodiments, security network 110 may provide near-ubiquitous access to the vehicle fleet. Security network 110 of embodiments may, for example, comprise a satellite constellation network, such as a low Earth orbit (LEO) Ku-band satellite constellation network, a LEO Ka-band satellite constellation network, a LEO L-band satellite constellation network, a Walker Delta Pattern satellite constellation network, a Walker Star satellite constellation network, a V-band low-Earth orbit (VLEO) satellite constellation network, etc. It should be appreciated that, although shown as comprising a single security network, security network 110 of embodiments of the present invention may be comprised of a plurality of security networks. Irrespective of the particular number of networks comprising the security network, security network 110 of embodiments herein facilitates security token data communication (e.g., security token data 128, such as cryptographic keys, seed parameters, key schedules, etc.) between vehicles of vehicles 150-154 and centralized mobility management platform 120.

In operation of system 100 illustrated in FIG. 1, centralized mobility management platform 120 and IVS 200 of any of vehicles 150-154 may utilize a control channel for control signaling with respect to various operations, such as the aforementioned communication of protected data and/or security token data. For example, such a control channel may be used to communicate communication environment information from the vehicle to the centralized mobility management platform, communicate data delivery network preference information from the vehicle to the centralized mobility management platform, to communicate data delivery network selection information from the centralized mobility management platform to the vehicle, etc. Reliable and resilient control channels for communicating control information between centralized mobility management platform 120 and vehicles 150-154 are provided in operation of system 100 using control channel plane 130 configured for migration of a control channel for a particular vehicle and dynamic reassignment among various in-band and out-of-band networks forming the control channel plane. For example, control channel plane 130 of embodiments includes at least one data delivery network of data network 140 (e.g., one or more data delivery networks of data delivery networks 142-146) and at least one network of security network 110 (e.g., one or more security networks of security network 110). It should be appreciated that, although the illustrated embodiment of control channel plane 130 is shown as including all underlying networks of security network 110 and data network 140, embodiments of control channel plane 130 may include fewer than all the underlying networks of security network 110 and/or data network 140, Moreover, although not shown in the illustrated embodiment, control channel plane 130 may include additional networks (referred to as auxiliary networks) which are out-of-band with respect to both security network 110 and data network 140.

Figure 2:
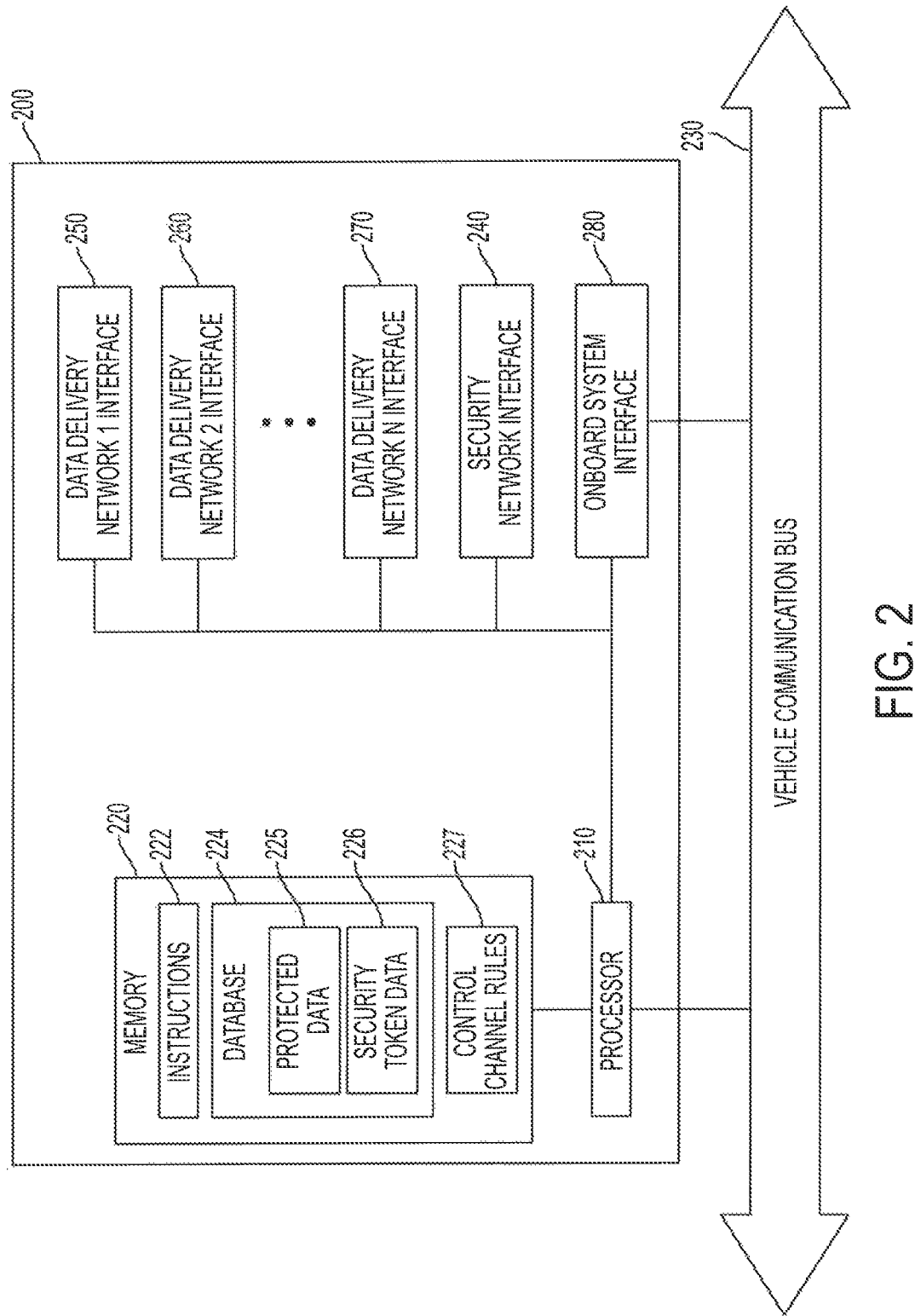
FIG. 2 shows details with respect to an IVS configured to cooperate with a centralized mobility management platform to establish and maintain reliable and resilient control channels for communicating control information between the centralized mobility management platform and a vehicle in which an instance of the IVS is disposed according to embodiments of the present invention.

Having described system 100 of embodiments configured to provide reliable and resilient control channels for communicating control information with onboard systems of vehicles, attention is now directed to FIG. 2 where further details are provided with respect to IVS 200 configured to cooperate with centralized mobility management platform 120 to establish and maintain reliable and resilient control channels for communicating control information between the centralized mobility management platform and a vehicle in which an instance of the IVS is disposed. Such control channels may, for example, be utilized for communicating command, control, and signaling communication between a centralized mobility management platform and instances of IVS 200 for facilitating secure data communication between centralized mobility management platform 120 and the respective vehicle of vehicles 150-154.

IVS 200 of embodiments is a processor-based system operable to establish and/or maintain a control channel within a control channel plane, such as to facilitate management and control of various protected data delivery operations with respect to the host vehicle. Accordingly, IVS 200 of the illustrated embodiment comprises processor 210 and memory 220, wherein processor 210 is operable under control of one or more instruction sets (e.g., instructions 222, control channel rules 227, etc.) and/or using various data (e.g., data of database 224) to perform functionality as described herein. For example, IVS 200 may obtain data for updating one or more onboard systems (e.g., ECUs) of the host vehicle, entertainment content for presentation to occupants of the host vehicle, etc. Additionally or alternatively, IVS 200 may, perhaps under control by centralized mobility management platform 120, provide various protected data collection operations with respect to the host vehicle, such as to obtain sensor data, vehicle operation data, etc.

Although shown in the illustrated embodiment as comprising a single processor-based system, it should be appreciated that IVS 200 of embodiments may comprise any number of processors and any number of systems (e.g., onboard systems). For example, although the illustrated embodiment of IVS 200 shows the functional blocks thereof disposed in a consolidated configuration (e.g., within a same housing), embodiments of IVS 200 may comprise a distributed configuration (e.g., distributing various functional blocks at different locations within the host vehicle, such as may use vehicle communication bus 230 and/or other communication links for intercommunication).

IVS 200 may, for example, comprise a processor that is configured to be disposed in a host vehicle and connected to one or more onboard systems and other electronics thereof, such as via vehicle communication bus 230 (e.g., Controller Area Network (CAN), Local Interconnect Network (LIN), Multifunction Vehicle Bus, Domestic Digital Bus (D2B), DC-BUS, Media Oriented Systems Transport (MOST), Vehicle Area Network (VAN), etc.), IVS 200 of embodiments may comprise a ruggedized housing containing various functional elements, such as those of the embodiment illustrated in FIG. 2, disposed within the structure of a host vehicle, such as embedded in the vehicle's roof, side pillars, cabin, front hood or nose section, and/or rear or tail section.

In being configured for operation to establish and/or maintain a control channel within a control channel plane, such as to facilitate management and control of various protected data delivery operations with respect to the host vehicle, IVS 200 of embodiments, in addition to the aforementioned processor, memory, and instructions, includes various interfaces for providing connectivity as described herein. In particular, IVS 200 of the illustrated embodiment comprises security network interface 240, data delivery network interfaces 250-270, and onboard system interface 280. It should be appreciated that, although not shown in FIG. 1 for simplicity, centralized mobility management platform 120 of embodiments likewise may comprise one or more such interfaces for providing connectivity as described herein.

Security network interface 240 may comprise one or more components for establishing data communication between IVS 200 and security network 100. For example, security network interface 240 of embodiments may provide a wireless communication interface including an antenna, a modulator, a demodulator, an FEC encoder, a differential encoder, a scrambler, a descrambler, a multiplexer, a demultiplexer, and/or other satellite modem components. Additionally or alternatively, security network interface 240 may provide a wired communication interface, such as for coupling IVS 200 to a network (e.g., Ethernet network terminal), another device (e.g., universal serial bus (USB) terminal), etc. In accordance with some embodiments, security network interface 240 may additionally or alternatively provide a communication interface (e.g., via vehicle communication bus 230) for facilitating use of one or more onboard communication system (e.g., onboard wireless modem, on-board cellular radio, etc.) for facilitating secure network communications. It should be appreciated that, although the illustrated embodiment shows a single security network interface, IVS 200 of embodiments may comprise more such security network interfaces, such as where security network 110 is comprised of a plurality of different security networks. Irrespective of the particular number of interfaces comprising the security network interface, security network interface 240 of embodiments facilitates communication of security data via security network 110. For example, IVS 200 may utilize security network interface 240 for security token data communication (e.g., security token data 226, such as cryptographic keys, seed parameters, key schedules, etc.) between IVS 200 and centralized mobility management platform 120 via security network 110. Moreover, security network interface 240 is configured to operate cooperatively with one or more of data delivery network interfaces 142-146 to facilitate control signal communications via a control channel capable of migration within control channel plane 130 in accordance with the concepts herein.

Data delivery network interfaces 250-270 may each comprise one or more components for establishing data communication between IVS 200 and data network 140. For example, each of data delivery network interfaces 250-270 may be configured for data communication with a corresponding one of data delivery networks 142-146 of data network 140. One or more data delivery network interfaces of data delivery network interfaces 250-270 may provide a wireless communication interface including Wi-Fi transceivers, cellular network transceivers, RF transceivers, satellite modems, and/or other wireless communication components. Additionally or alternatively, one or more data delivery network interface of data delivery network interfaces 250-270 may provide a wired communication interface, such as for coupling IVS 200 to a network (e.g., Ethernet network terminal), another device (e.g., universal serial bus (USB) terminal), etc. In accordance with some embodiments, one or more data delivery network interface of data delivery network interfaces 250-270 may additionally or alternatively provide a communication interface (e.g., via vehicle communication bus 230) for facilitating use of one or more onboard communication system (e.g., onboard wireless modem, on-board cellular radio, etc.) for facilitating protected data communications. It should be appreciated that, although the illustrated embodiment shows 3 data delivery network interfaces, embodiments of the present invention may comprise more or fewer data delivery network interfaces, such as where data network 140 is comprised of more or fewer data networks. Irrespective of the particular number of interfaces comprising the data delivery network interfaces, data delivery network interfaces 250-270 of embodiments facilitate communication of protected data via data network 140. For example, IVS 200 may utilize one or more data delivery network interface of data delivery network interfaces 142-146 for protected data communication (e.g., protected data 225) between IVS 200 and centralized mobility management platform 120 via data network 140. Moreover, one or more data delivery network interface of data delivery network interfaces 250-270 is configured to operate cooperatively with security network interface 240 to facilitate control signal communications via a control channel capable of migration within control channel plane 130 in accordance with the concepts herein.

Onboard system interface 280 may comprise one or more components for establishing data communication between IVS 200 and one or more other onboard system of the host vehicle, such as via vehicle communication bus 230. For example, onboard system interface 280 may communicatively couple IVS 200 with one or more ECUs (e.g., engine system ECUs, transmission system ECUs, chassis electronic ECUs, active safety system ECUs, driver assistance system ECUs, etc.), such as for controlling ECU data or code updates, controlling collecting data from ECUs, etc. In alternative embodiments, onboard system interface 280 of embodiments may be implemented as software on processor 210. Onboard system interface 280 of embodiments may additionally or alternatively couple IVS 200 with one or more onboard systems other than ECUs, such as vehicle-based entertainment systems, GPS location determination systems, etc., such as for controlling onboard system data updates, obtaining data from onboard systems, etc. It should be appreciated that, although the illustrated embodiment shows a single onboard system interface, IVS 200 of embodiments may comprise more such onboard system interfaces, such as where onboard systems require different interfaces. Irrespective of the particular number of interfaces comprising the onboard system interface, onboard system interface 280 of embodiments facilitates communication of data via vehicle communication bus 230. It should be appreciated, however, that processor 210 may additionally or alternatively communicate directly via vehicle communication bus 230, such as where complex protocols or other interface infrastructure which is otherwise not directly supported by the processor are not needed. Accordingly, depending upon the particular configuration of IVS 200, the connection shown in FIG. 2 between onboard system interface 280 and vehicle communication bus 230 or between processor 210 and vehicle communication bus 230 may be omitted.

Having described system 100, and IVS 200 of embodiments thereof, operation to provide reliable and resilient control channels using such systems in accordance with the concepts herein will now be provided. Such operation is described below with reference to both establishing control channels within a control channel plane and migrating an established control channel and dynamically reassigning it among various in-band and out-of-band networks of the control channel plane to provide reliable and resilient control channels.

A control channel may be initially established between centralized mobility management platform 120 and IVS 200 of a particular vehicle using any of one or more networks of the control channel plane (e.g., one or more networks of data network 140 and/or security network 110). Establishing of a control channel in the control channel plane may be initiated in accordance with embodiments by IVS 200 and/or by centralized mobility management platform 120.

Figure 3:
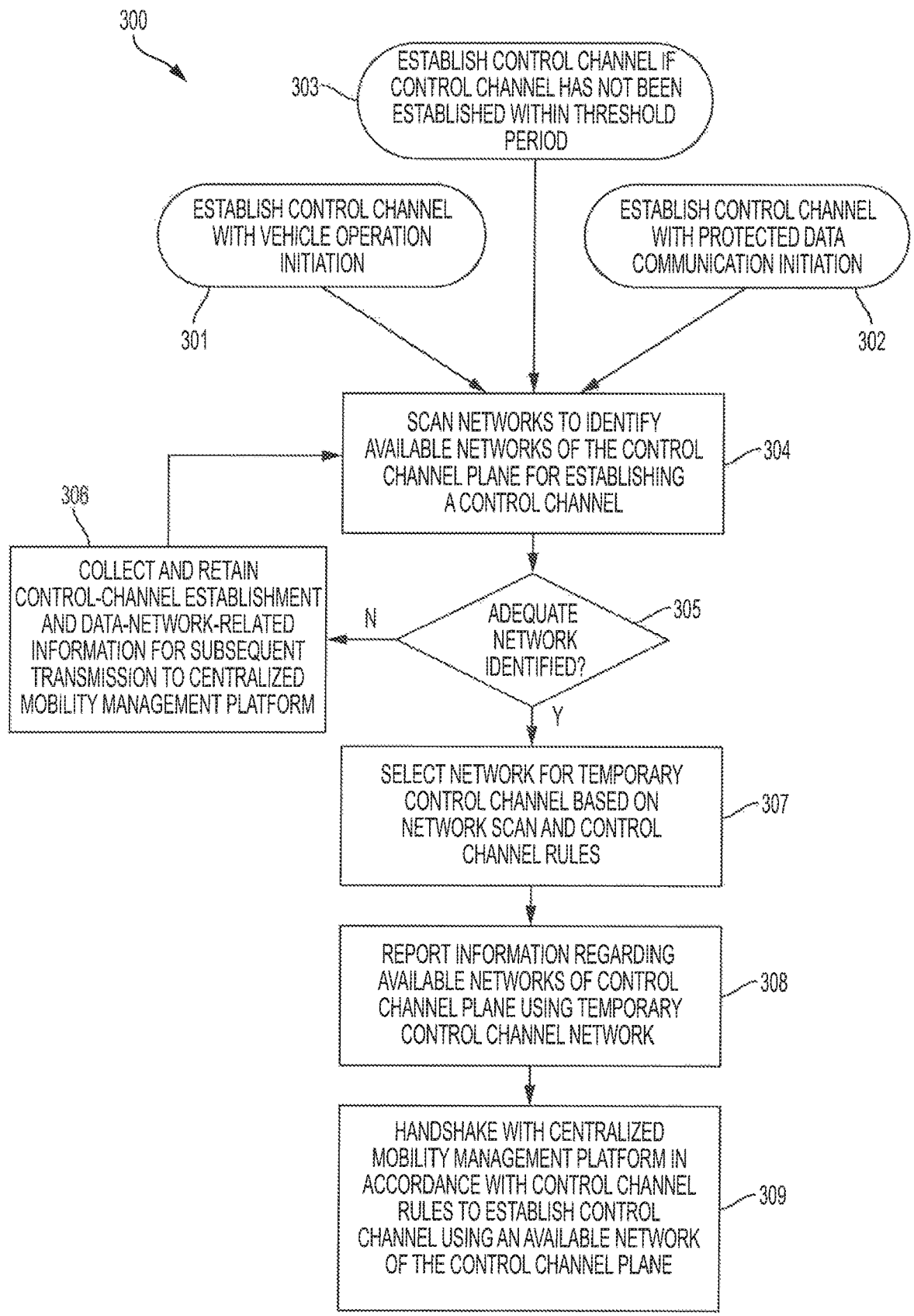
FIG. 3 shows a flow diagram of operation as may be implemented by logic of an IVS to establish a control channel in a control channel plane according to embodiments of the present invention.

A flow diagram showing exemplary operation with respect to an instance of IVS 200 initiating the establishing of a control channel in control channel plane 130 is provided in FIG. 3. A flow diagram showing exemplary operation with respect to centralized mobility management platform 120 initiating the establishing of a control channel in control channel plane 130 is provided in FIG. 4. Irrespective of the particular system initiating the establishing of a control channel or the particular network or networks of the control channel plane in which the control channel is established, operation in accordance with the present invention provides for migration of the control channel among the various in-band and out-of-band networks of the control channel plane. A flow diagram showing exemplary operation with respect to migrating a control channel and dynamically reassigning it among networks of control channel plane 130 is provided in FIG. 5. In some embodiments, the selection of a specific control channel in control channel plane 130 may be unique for each vehicle of a vehicle fleet (e.g., a selected vehicle of vehicles 150-454) that is connected to the centralized mobility management platform 120. For example, a plurality of vehicles may, at a specific point in time, be controlled by the centralized mobility management platform 120 via the very same control channel within control channel plane 130, while other vehicles may be controlled via different control channels within control channel plane 130. Dynamically migrating and reassigning the control channel among control channel plane 130 of embodiments involves continuously and dynamically identifying, changing, and mapping a control channel for each vehicle of a vehicle fleet (e.g., a selected vehicle of vehicles 150-154) onto the available plurality of possible control channels within control channel plane 130.

FIG. 3 shows flow 300 as may be implemented by logic of IVS 200 of embodiments of the invention to establish of a control channel in control channel plane 130. For example, instructions 222 may include instructions that, when executed by processor 210 of FIG. 2, implement logic to cause processor 210 to perform the operations of flow 300.

IVS 200 of embodiments may initiate operation to establish a control channel in one or more situations. For example, the exemplary embodiment of flow 300 may be initiated by IVS 200 to establish a control channel in response to IVS 200 detecting initiation of vehicle operation, as shown at block 301. Establishing a control channel in this situation (i.e., initiation of vehicle operation) facilitates making a reliable and resilient control channel for communicating control information with onboard systems of the vehicle available whenever the vehicle is being operated, such as to enable delivery of content useful to the operation of the vehicle, to provide content delivery during times of engine operation to minimize depletion of vehicle battery systems, to enable reporting of vehicle operation information in real-time or near real-time, etc.

Additionally or alternatively, the exemplary embodiment of flow 300 may be initiated by IVS 200 to establish a control channel in response to IVS 200 determining that data content communication (e.g., protected data delivery) between one or more on-board system of the vehicle and centralized mobility management platform 120 is desired, as shown at block 302. IVS 200 may, for example, communicate with other on-board systems of the vehicle via vehicle communication bus 230 and/or monitor vehicle communication bus 230 to determine that an on-board system is desirous of data content communication. Of course, IVS 200 may itself be desirous of data content communication and thus internally determine that data content communication is desired. Establishing a control channel in association with desired data content communication facilitates making a reliable and resilient control channel for communicating control information with onboard systems of the vehicle available whenever one or more on-board system of the vehicle has a need for data content communication, such as to enable reporting of vehicle operation information as a report becomes available, enable on-demand content requests from the vehicle, etc., when a control channel has not otherwise been established (e.g., no network included in the control channel plane was available at vehicle operation initiation, a previously established control channel was terminated due to inactivity or non-use, a previously established control channel has dropped or otherwise been disrupted, etc.).

The exemplary embodiment of flow 300 may additionally or alternatively be initiated by IVS 200 to establish a control channel when a control channel has not been otherwise established between IVS 200 and centralized mobility management platform 120 in some period, as shown at block 303. Establishing a control channel in this situation (i.e., when not otherwise established within some period) facilitates ensuring that a reliable and resilient control channel for communicating control information with onboard systems of the vehicle is made available from time-to-time, such as to enable data content communication in situations where establishing a control channel in other situations has chronically failed, to facilitate establishing communications periodically for "still-alive" reporting, etc. The periods in which a control channel may be established according to embodiments when a control channel is not otherwise established may be a predetermined period of time (e.g., hours, days, weeks, months, etc.), a predetermined period of events (e.g., a number of vehicle operation initiation cycles, operation of a particular function of the vehicle, etc.), or other period.

Irrespective of the particular situation in which establishing a control channel is initiated, flow 300 of the illustrated embodiment operates to identify networks of control channel plane 130 that are available for use in establishing a control channel at block 304. For example, logic of IVS 200 may control security network interface 240 and data delivery network interfaces 250-270 to scan the networks of the data network and the security network included in control channel plane 130 to identify one or more networks of the control channel plane suitable for establishing a control channel. Each network interface may, for example, monitor received signal strength, load and congestion (e.g., amount of network traffic), bandwidth (e.g., transfer speed, channel capacity, channel throughput, etc.), quality of service (e.g., packet loss, bit rate, throughput, transmission delay, availability, jitter, etc.), etc. for corresponding networks of control channel plane 130. In operation according to embodiments, a network may be determined to be suitable for establishing a control channel, and thus available, where the scan indicates that the network meets one or more criteria (e.g., above a signal strength threshold, above an available bandwidth threshold, above a quality metric threshold, below a noise metric threshold, below a latency threshold, etc.).

The criteria (e.g., the particular metric(s) and/or threshold) used for determining available networks of the control channel plane that are available may be different for different ones of the networks of the control channel plane, such as to tailor the network availability determination for each network of the control channel plane based on the resources of a particular network being suitable for control channel communications. The determination regarding availability of a network of control channel plane 130 may be based upon predicted criteria, such as by logic of IVS 200 querying one or more other on-board systems (e.g., a UPS navigation system, a vehicle speed control system, etc.) to obtain information such as vehicle position, direction, velocity, terrain topology, etc. and using presently detected criteria for a network to predict that the network will meet one or more criteria at a time relevant for establishing a control channel.

The various criteria, thresholds, predictive metrics, etc. utilized by IVS 200 in determining networks of control channel plane 130 are suitable for establishing a control channel may be stored, for example, as part of control channel rules 227 of embodiments.

In operation according to embodiments of the invention, logic of centralized mobility management platform 120 selects the particular network of control channel plane 130 for establishing a control channel. For example, centralized mobility management platform 120 of embodiments has visibility into various information, in addition to the attributes of the networks monitored by the vehicle and the various criteria, thresholds, and metrics used to determine network availability, useful in control channel plane network selection. A network of the control channel plane may be selected based upon various factors, such as may include geographic coverage, cost, network availability, network resource set, network congestion, network latency, bandwidth, quality, etc. Centralized mobility management platform 120 may have information regarding the use of the various networks of control channel plane 130 by vehicles of the fleet (e.g., whether for security token data communication as a security network, protected data content communication as a data network, or for control information communication as a control channel plane network), costs associated with the use of networks of control channel plane 130 (e.g., data transmission charges, rerouting processing, etc.), network quality (e.g., quality of service, capability to meet urgency requirements, best path, etc.) access to the particular networks of control channel plane 130 by vehicles of the fleet, etc. Accordingly, centralized mobility management platform 120 may be preferred for selecting the particular network of control channel plane 130 for establishing a control channel according to embodiments of the invention.

Accordingly, processing at block 305 of flow 300 illustrated in FIG. 3 determines whether an adequate network has been found to establish as a control channel. If an adequate network has not been found to assign as the control channel, processing according to the illustrated embodiment returns to block 306 to collect and retain control-channel establishment and data-network-related information for subsequent transmission to centralized mobility management platform 120 once the control channel has been established, and processing according to the illustrated embodiment returns to block 304 for another iteration of the attempt to identify networks of control channel plane 130 that are available for use in establishing a control channel. However, if an adequate network has been found to assign as the control channel, processing to identify networks of control channel plane 130 that are available for use in establishing a control channel is concluded and flow 300 proceeds to block 307.

Consistent with the foregoing, IVS 200 of embodiments operates to report control channel plane network availability information to centralized mobility management platform 120 for use in selecting a network of control channel plane 130 to establish a control channel. It should be appreciated, however, that a control channel for reporting the control channel plane network availability information has not yet been established in the foregoing example. Accordingly, at block 307 of the illustrated embodiment of flow 300, IVS 200 may select a network for communicating information such as the control channel plane network availability information used in establishing a control channel between centralized mobility management platform 120 and IVS 200. For example, logic of IVS 200 may utilize control channel network selection rules of control channel rules 227 to select a network from the available networks of control channel plane 130 for establishing a temporary control channel in which to communicate control channel plane network availability information to centralized mobility management platform 120.

The control channel network selection rules utilized by 200 in selecting a network for establishing a temporary control channel may define a hierarchy of networks (e.g., based upon geographic coverage, cost, availability, bandwidth, resource set, etc.), wherein a network of the available control channel plane networks highest in the hierarchy may be selected for establishing a temporary control channel. Additionally or alternatively, the control channel network selection rules utilized by IVS 200 in selecting a network for establishing a temporary control channel may define one or more fallback networks which, when available, may be selected for establishing a temporary control channel. A fallback network of embodiments may operate as a safety-net with respect to both control channel plane 130 and a plurality of the networks of data network 140 (e.g., due to comparatively lower bandwidth and higher cost). For example, a network of security network 110 included in control channel plane 130 may, for example, comprise a satellite constellation network providing broader geographic coverage (e.g., near-ubiquitous coverage) than any individual data delivery network of data network 140 included in control channel plane 130, and thus may be identified as a fallback network for defaulting to in establishing a temporary control channel when available, such as whenever the fallback network is available (e.g., the network of security network 110 is highest in the temporary control channel network hierarchy) or when the fallback network is available and no other network of the network of control channel plane 130 is available (e.g., the network of security network 110 lowest in the temporary control channel network hierarchy), it should be appreciated that a fallback network utilized according to embodiments need not be a statically selected network, but instead may change from time-to-time (e.g., a fallback network may be variable and/or may be particular to a particular vehicle, such as to correspond to the last control channel plane network used for the control channel with respect to the particular vehicle). The use of a defaulted fallback network for establishing a temporary control channel (e.g., the fallback network being highest in the temporary control channel network hierarchy) may be desirable for expediting establishing the temporary control channel (e.g., the fallback network may be monitored more frequently/actively by centralized mobility management platform 120, protocols for establishing the temporary control channel may be optimized for a fallback network, a fallback network may be selected based upon generally superior availability and/or quality characteristics, etc.), reducing processing requirements for establishing the temporary control channel (e.g., logic of IVS 200 may be optimized for establishing the temporary control channel using a fallback network, a fallback network may be selected based upon robust data delivery protocols to avoid data delivery failures and retransmissions, etc.), and/or the like, it should be appreciated, however, that although any particular network of control channel plane 130 may provide generally reliable coverage within a relatively large geographic area, the network may nevertheless be unavailable in some situations (e.g., a satellite constellation network providing broad geographic coverage may be unavailable when a vehicle is disposed in a parking garage). Accordingly, control channel network selection rules are utilized according to embodiments to select a network from the available networks of control channel plane 130 for establishing a temporary control channel in which to communicate control channel plane network availability information to centralized mobility management platform 120, even where a fallback network is identified for defaulting the temporary control channel network selection to.

Having selected a network for the temporary control channel at block 307 of the embodiment illustrated in FIG. 3, flow 300 proceeds to block 308 wherein IVS 200 reports control channel plane network availability information to centralized mobility management platform 120 via a temporary control channel implemented via the selected network. For example, IVS 200 may utilize one of network interfaces 240-270 corresponding to the selected network of control channel plane 130 to signal centralized mobility management platform 120 and communicate information regarding one or more of the control channel plane networks determined to be available for use in establishing a control channel between IVS 200 and centralized mobility management platform 120. The information communicated to centralized mobility management platform 120 of embodiments may comprise information regarding a selected particular network of control channel plane 130 determined to be available by IVS 200 (e.g., a network that is determined to be best or preferred for use by the IVS, such as by applying control channel network selection rules of control channel rules 227 to monitored attributes of the control channel plane networks). Additionally or alternatively, the information communicated to centralized mobility management platform 120 may comprise information regarding a plurality (e.g., all or some subset) of the networks of control channel plane 130 determined to be available by IVS 200 (e.g., a hierarchal list of available networks in order of preferences for use by the IVS as may be determined by applying control channel network selection rules of control channel rules 227 to monitored attributes of the control channel plane networks). Information regarding available control channel plane networks communicated by IVS 200 of embodiments may, for example, comprise identification of an available one or more control channel plane network and/or information regarding monitored attributes (e.g., received signal strength, load and congestion, latency, bandwidth, quality of service, features of the networks available or active in the area, etc.) of an available one or more control channel plane network.

In operation according to embodiments of the invention, centralized mobility management platform 120 selects the particular network of control channel plane 130 for establishing a control channel. Accordingly, the information regarding available control channel plane networks communicated to centralized mobility management platform 120 by IVS 200 is configured to facilitate selection of an appropriate network of control channel plane 120 by the centralized mobility management platform, To aid in facilitating selection of a network of the control channel plane by centralized mobility management platform 120, IVS 200 of embodiments may provide information in addition to the aforementioned information regarding available control channel plane networks. For example, vehicle positional information (e.g., GPS derived time information, vehicle geolocation, non-GPS based navigation information such as inertial-measurement-unit-based systems or triangulation via one or more data networks of data network 140, vehicle direction, vehicle velocity, terrain topology near the vehicle position, etc.) may be communicated to centralized mobility management platform 120 by IVS 200 to facilitate logic of centralized mobility management platform 120 performing the operations of choosing a network of the control channel plane for establishing a control channel with respect to the vehicle.

It should be appreciated that, although IVS 200 may indicate a preference regarding selection of a network for establishing the control channel, centralized mobility management platform 120 may nevertheless select a different network of the control channel plane networks available to IVS 200. For example, logic of centralized mobility management platform 120 may make a network selection based upon information (e.g., network availability, network congestion, network latency, bandwidth, cost, urgency, best path, etc.) not available to IVS 200, despite the selected network not being the preferred or "best" network of the control channel plane networks available for use by IVS 200.

In operation according to embodiments, control channel plane network selection rules (e.g., control channel plane network selection rules of control channel rules 129 applied to the information regarding available control channel plane networks provided by IVS 200, any additional information provided by IVS 200, and/or relevant information available to centralized mobility management platform 120) applied by logic of centralized mobility management platform 120 may select a network of control channel plane 130 (e.g., a network of data network 140 included in the control channel plane or a network of security network 110 included in the control channel plane) for initially establishing a control channel between centralized mobility management platform 120 and IVS 200. Accordingly, at block 309 of the illustrated embodiment of flow 300, centralized mobility management platform 120 and IVS 200 establish a control channel therebetween using the control channel plane network selected by centralized mobility management platform 120. For example, centralized mobility management platform 120 may communicate with IVS 200 using the previously established temporary control channel to coordinate establishing a control channel using the control channel plane network selected by the centralized mobility management platform. Alternatively, centralized mobility management platform 120 may utilize a network interface corresponding to the selected network of control channel plane 130 to signal IVS 200 (e.g., IVS 200 may periodically monitor networks of control channel plane 130 for control signals for establishing a control channel) and establish a control channel therebetween.

Figure 4:
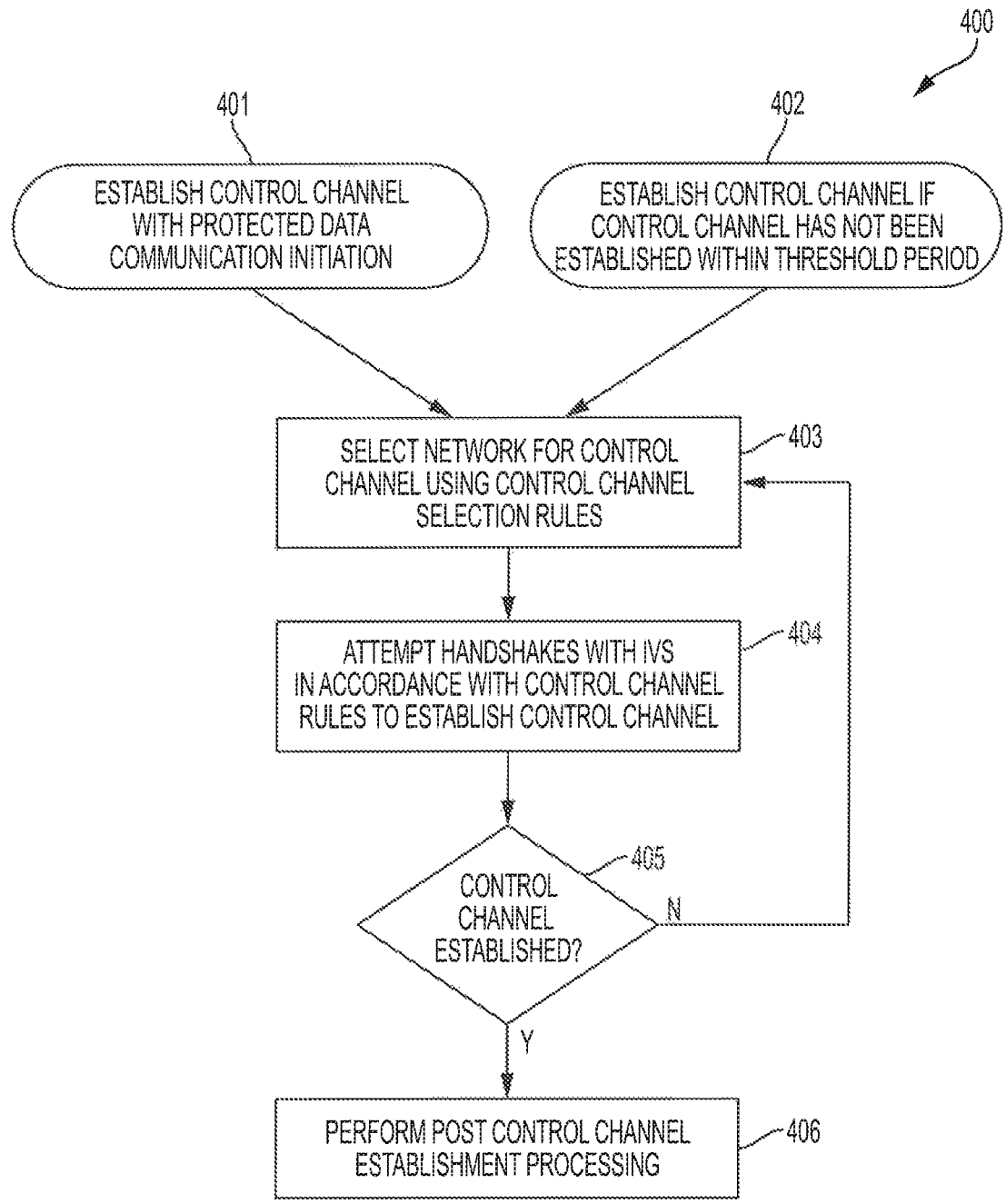
FIG. 4 shows a flow diagram of operation as may be implemented by logic of a centralized mobility management platform to establish a control channel in a control channel plane according to embodiments of the present invention.

FIG. 4 shows flow 400 as may be implemented by logic of centralized mobility management platform 120 of embodiments of the invention to establish of a control channel in control channel plane 130. For example, instructions 125 may include instructions that, when executed by processor 122 of FIG. 1, implement logic to cause processor 122 to perform the operations of flow 400.

Centralized mobility management platform 120 of embodiments may initiate operation to establish a control channel in one or more situations. For example, the exemplary embodiment of flow 400 may be initiated by centralized mobility management platform 120 to establish a control channel in response to centralized mobility management platform 120 determining that data content communication (e.g., protected data delivery) between the centralized mobility management platform and one or more on-board system of a particular vehicle is desired, as shown at block 401. Centralized mobility management platform 20 may, for example, communicate with other systems (e.g., vehicle manufacturer fleet maintenance servers, vehicle equipment manufacturer maintenance servers, navigation database servers, content provider servers, etc.) to determine that delivery of data content (e.g., protected data) to an on-board system of one or more vehicles of the fleet of vehicles is desired. Of course, centralized mobility management platform 120 may itself have data content for communication to one or more vehicles and thus may internally determine that data content communication is desired. Establishing a control channel in association with desired data content communication facilitates making a reliable and resilient control channel for communicating control information with onboard systems of the vehicle available whenever one or more system external to the vehicle has a need for data content communication, such as to enable updating data of one or more on-board systems as updates become available, facilitate obtaining vehicle operation information in real-time, near real-time, or as otherwise desired by an external system, etc., when a control channel has not otherwise been established (e.g., no network included in the control channel plane was available at vehicle operation initiation, a previously established control channel was terminated due to inactivity or non-use, a previously established control channel has dropped or otherwise been disrupted, etc.).

The exemplary embodiment of flow 400 may additionally or alternatively be initiated by centralized mobility management platform 120 to establish a control channel when a control channel has not been otherwise established between an IVS of a particular vehicle and centralized mobility management platform 120 in some period, as shown at block 402. Establishing a control channel in this situation (i.e., when not otherwise established within some period) facilitates ensuring that a reliable and resilient control channel for communicating control information with onboard systems of the vehicle is made available from time-to-time, such as to enable data content communication in situations where establishing a control channel in other situations has chronically failed, to facilitate establishing communications periodically for "still-alive" reporting, etc. The periods in which a control channel may be established according to embodiments when a control channel is not otherwise established may be a predetermined period of time (e.g., hours, days, weeks, months, etc.), a predetermined period of events (e.g., a number of vehicle operation initiation cycles, operation of a particular function of the vehicle, etc.), or other period.

It should be appreciated that an instance of flow 400 may be performed with respect to each vehicle for which centralized mobility management platform 120 wishes to establish a control channel with. Accordingly, control channels for any number of particular vehicles of a fleet of vehicles may be established by embodiments of centralized mobility management platform 120.

Irrespective of the particular situation in which establishing a control channel is initiated, flow 400 of the illustrated embodiment operates to select a network of control channel plane 130 for use in establishing a control channel at block 403 with respect to one or more selected vehicles of the fleet of vehicles. For example, logic of centralized mobility management platform 120 may make a network selection based upon various information (e.g., network availability, network congestion, network latency, bandwidth, cost, urgency, best path, etc.) available to the centralized mobility management platform, despite the corresponding instance of IVS 200 not having provided information regarding available control channel plane networks or other information for facilitating control channel plane network selection to centralized mobility management platform 120. In operation according to embodiments, control channel plane network selection rules (e.g., control channel plane network selection rules of control channel rules 129 applied to relevant information available to centralized mobility management platform 120) applied by logic of centralized mobility management platform 120 may select a network of control channel plane 130 (e.g., a network of data network 140 included in the control channel plane or a network of security network 110 included in the control channel plane) for initially establishing a control channel between centralized mobility management platform 120 and IVS 200.

The control channel network selection rules utilized by centralized mobility management platform 120 in selecting a network for initially establishing a control channel may define a hierarchy of networks (e.g., based upon geographic coverage, cost, availability, bandwidth, resource set, etc.), wherein a network of the control channel plane networks highest in the hierarchy may be initially selected for establishing a control channel. Additionally or alternatively, the control channel network selection rules utilized by centralized mobility management platform 120 in selecting a network for establishing a control channel may define one or more fallback networks which may be initially selected for establishing a control channel. A fallback network of embodiments may operate as a safety-net with respect to both control channel plane 130 and a plurality of the networks of data network 140 (e.g., due to comparatively lower bandwidth and higher cost). A network of security network 110 included in control channel plane 130 may, for example, comprise a satellite constellation network providing broader geographic coverage (e.g., near-ubiquitous coverage) than any individual data delivery network of data network 140 included in control channel plane 130, and thus may be identified as a fallback network for defaulting to in initially establishing a control channel, such as whenever the fallback network is available (e.g., the network of security network 110 is highest in the control channel network hierarchy) or when the fallback network is available and no other network of the network of control channel plane 130 is available (e.g., the network of security network 110 lowest in the control channel network hierarchy). It should be appreciated that a fallback network utilized according to embodiments need not be a statically selected network, but instead may change from time-to-time (e.g., a fallback network may be variable and/or may be particular to a particular vehicle, such as to correspond to the last control channel plane network used for the control channel with respect to the particular vehicle). The use of a defaulted fallback network for initial selection for use in initially establishing a control channel (e.g., the fallback network being highest in the control channel network hierarchy) may be desirable for expediting establishing the control channel (e.g., the fallback network may provide coverage in which the particular vehicle is likely to be disposed, the fallback network may be monitored more frequently/actively by IVS 200, a fallback network may be selected based upon generally superior availability and/or quality characteristics, etc.), reducing processing requirements for establishing the control channel (e.g., iterations of attempts to establish the control channel through reselection of a control channel plane network may be reduced), and/or the like.

Having selected a network of control channel plane 130 for initially establishing a control channel, processing according to the illustrated embodiment of flow 400 proceeds to block 404 wherein centralized mobility management platform 120 attempts to establish a control channel with an IVS of one or more selected vehicles using the selected control channel plane network. For example, centralized mobility management platform 120 may utilize a network interface corresponding to the selected network of control channel plane 130 to signal the IVS of one or more vehicles (e.g., each IVS may periodically monitor networks of control channel plane 130 for control signals for establishing a control channel) and, if successful in communicating with the one or more vehicles, establish a control channel therebetween. It should be appreciated, however, that a particular vehicle for which a control channel is to be established may not be operable within the selected network of the control channel plane (e.g., the vehicle may be disposed outside of the coverage area of the selected network, the vehicle may be exposed to substantial interference with respect to the selected network, the vehicle may not be operational, etc.). For example, although any particular network of control channel plane 130 may provide generally reliable coverage within a relatively large geographic area, the network may nevertheless be unavailable with respect to any particular vehicle in some situations (e.g., a satellite constellation network providing broad geographic coverage may be unavailable when a vehicle is disposed in a parking garage).

Accordingly, processing at block 405 of flow 400 illustrated in FIG. 4 determines whether the control channel has been successfully established. For example, logic of centralized mobility management platform 120 may operate to determine if a predetermined handshake or other response from the IVS has been performed in response to the attempt to establish the control channel. If the control channel has not been established, processing according to the illustrated embodiment returns to block 403 for another iteration of the attempt to establish the control channel wherein a next network of control channel plane 130 is selected (e.g., based upon various information available to the centralized mobility management platform through application of control channel plane network selection rules). However, if the control channel has been established, processing to initially establish the control panel according to the illustrated embodiment is concluded and flow 400 proceeds to block 406 wherein post control channel establishment processing is performed (e.g., processing to communicate protected data to the vehicle, processing to obtain information regarding available control channel plane networks or other information for facilitating control channel plane network selection, processing to migrate the control channel and dynamically reassign it to another network of control channel plane 130, etc.).

Figure 5:
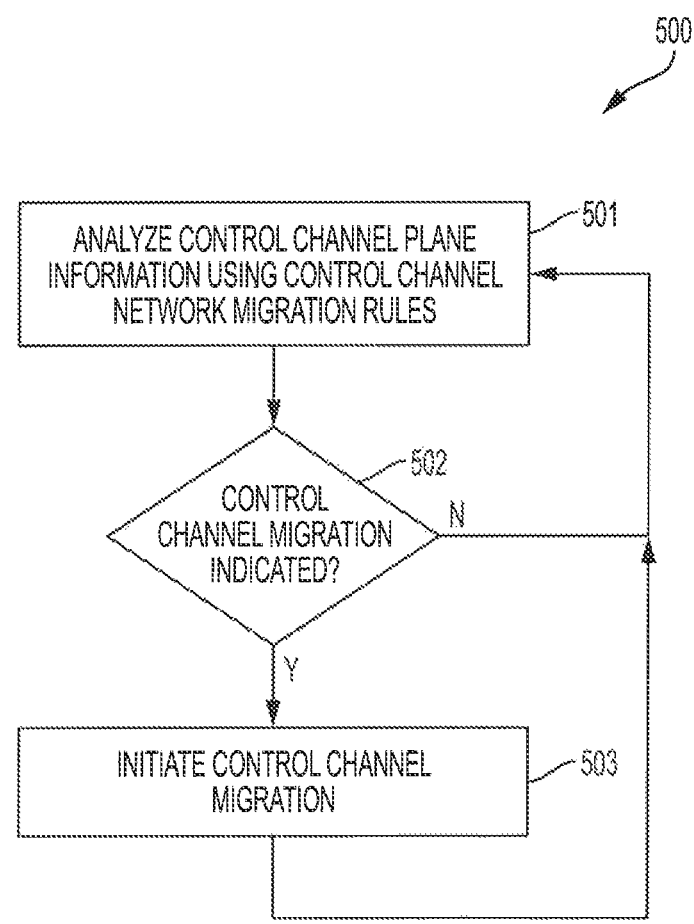
FIG. 5 shows a flow diagram of operation as may be implemented by logic of a centralized mobility management platform to migrate a control channel among networks of a control channel plane according to embodiments of the present invention.

FIG. 5 shows flow 500 as may be implemented by logic of centralized mobility management platform 120 of embodiments of the invention to migrate a control channel and dynamically reassign it among networks of control channel plane 130. For example, instructions 125 may include instructions that, when executed by processor 122 of FIG. 1, implement logic to cause processor 122 to perform the operations of flow 500.

Centralized mobility management platform 120 of embodiments may provide operation to migrate a control channel (e.g., the control channel established in accordance with flow 300 of FIG. 3 or flow 400 of FIG. 4) and dynamically reassign it among the various networks of control channel plane 130 (e.g., the data delivery networks of data network 140 included in control channel plane 130 and the security networks of security network 110 included in control channel plane 130) to provide a reliable and resilient control channel for communicating control information between centralized mobility management platform 120 and one or more instance of IVS 200. For example, the exemplary embodiment of flow 500 may be initiated by centralized mobility management platform 120 to provide for migrating a control channel among the networks of control channel plane 130 whenever a control channel has been established. It should be appreciated that an instance of flow 500 may be performed with respect to the control channel associated with each vehicle of a fleet of vehicles for which a control channel is established. Accordingly, control channel network migration may be provided for any number of particular vehicles of a fleet of vehicles by embodiments of centralized mobility management platform 120.

The migration of the control channel among networks of control channel plane 130 may be dynamically controlled, such as through application of control channel migration rules of control channel rules 129 by logic of centralized mobility management platform 120, based upon various factors, such as may include geographic coverage, cost, network availability, network resource set, network congestion, network latency, bandwidth, quality, etc. Accordingly, at block 501 of the illustrated embodiment of flow 500, logic of centralized mobility management platform 120 operates to analyze various control channel plane information using the aforementioned control channel migration rules. It should be appreciated that centralized mobility management platform 120 may have control channel plane information available for use in controlling migration of a control channel within the control channel plane that was not available to the centralized mobility management platform when initiating establishing the control channel (e.g., in accordance with flow 400 of FIG. 4). For example, an IVS associated with the control channel may (e.g. periodically, from time-to-time, in response to a query from the centralized mobility management platform, etc.) provide (e.g., via the control channel established therebetween) centralized mobility management platform 120 with information (e.g., identification of an available one or more control channel plane network and/or information regarding monitored attributes, such as received signal strength, load and congestion, bandwidth, quality of service, features of the networks available or active in the area, etc., of one or more control channel plane network) regarding one or more of the control channel plane networks determined to be available for migration of a control channel. Similarly, an IVS associated with the control channel may additionally or alternatively provide centralized mobility management platform 120 with information other than control channel plane network information (e.g., UPS derived time information, vehicle geolocation, non-GPS-based navigation information such as inertial-measurement-unit-based systems and/or triangulation via one or more data networks of data network 140, vehicle direction, vehicle velocity, terrain topology near the vehicle position, etc.). Additionally or alternatively, centralized mobility management platform 120 of embodiments may have access to information regarding the use of the various networks of control channel plane 130 by vehicles of the fleet (e.g., whether for security token data communication as a security network, protected data content communication as a data network, or for control information communication as a control channel plane network), costs associated with the use of networks of control channel plane 130 (e.g., data transmission charges, rerouting processing, quality of service, etc.), access to the particular networks of control channel plane 130 by vehicles of the fleet, etc. Any or all such information may be utilized by logic of centralized mobility management platform 120 with the control channel migration rules to perform analysis for determining Whether control channel network migration is indicated with respect to a particular vehicle in the present situation.

In operation according to embodiments of the invention, migration of the control channel from a network of control channel plane 130 currently used for the control channel to another network of control channel plane 130 is based upon control channel migration rules (e.g., control channel migration rules of control channel rules 129) applied by logic of centralized mobility management platform 120 to communication environment information provided by the vehicle and network utilization information available to the centralized mobility management platform to maintain the control channel between the vehicle and the centralized mobility management platform. Accordingly, centralized mobility management platform 120 may operate at block 501 to analyze information regarding one or more particular networks of the control channel plane determined to be available, a hierarchical list of available networks in order of preferences for use by the IVS, vehicle geolocation information, etc., as may be reported by an instance of IVS 200 hosted by the respective vehicle, Centralized mobility management platform 120 may additionally or alternatively operate at block 501 to analyze information available to the centralized mobility management platform such as available bandwidth (e.g., transfer speed, channel capacity, channel throughput, etc.), network loading (e.g., network congestion, network latency, current and/or predicted network use whether for security token data communication as a security network, protected data content communication as a data network, or for control information communication as a control channel plane network, etc.), costs associated with use of the networks (e.g., data transmission charges, rerouting processing, etc.), geographic access to the network (e.g., network availability as reported by an IVS, network availability as determined by the centralized mobility platform, such as from geolocation information reported by an IVS and network coverage maps available to the centralized mobility platform, predicted availability, such as determined from vehicle direction and velocity information, etc.), network quality (e.g., quality of service, capability to meet urgency requirements, best path, etc.), and/or the like.

In analyzing the control channel plane information at block 501, centralized mobility management platform 120 of embodiments applies control channel migration rules with respect to the foregoing information (e.g., the information provided by the vehicle, the information provided by other vehicles of the vehicle fleet, and/or the information otherwise available to centralized mobility management platform 120) for determining if control channel migration is indicated in the situation. The control channel migration rules may, for example, define a hierarchy of various factors (e.g., geographic coverage, cost, network availability, network resource set, network congestion, network latency, bandwidth, quality, etc.), and analyze the information associated with one or more of the networks of control channel plane 130 in light of these factors for determining if control channel migration is indicated. For example, logic of centralized mobility management platform 120 may rank a plurality of networks of control channel plane 120 that are available to the particular vehicle-based upon aspects of those networks meeting one or more threshold levels of the foregoing factors. In another example, logic of centralized mobility management platform 120 may create a network heat map using communication environment information provided by each vehicle of the vehicle fleet.

Having analyzed the control channel plane information, logic of centralized mobility management platform 120 of embodiments operates to determine if control channel migration to another network of control channel plane 130 is indicated, as shown at block 502 of flow 500. For example, centralized mobility management platform 120 may determine that a particular network of control channel plane 130 may provide a more desirable (e.g., providing better control channel throughput, reliability, quality, etc.; providing same or acceptable control channel throughput, reliability, quality, etc. at a lesser cost; or otherwise better serves one or more factors for providing a resilient and reliable control channel) network for maintaining the control channel than a network of control channel plane 130 presently hosting the control channel. In operation according to embodiments, centralized mobility management platform 120 may determine if there is a network of control channel plane 130 which better meets one or more criteria relevant to the current situation with respect to the particular vehicle, such as based upon application of control channel plane network migration rules (e.g., control channel migration rules of control channel rules 129) by logic of centralized mobility management platform 120, For example, logic of centralized mobility management platform 120 may analyze a ranking of networks of control channel plane 120 resulting from the analysis of the control channel plane information to determine a relative ranking of a network of the control channel plane currently in use for providing the control channel. In another example, logic of centralized mobility management platform 120 may analyze a network heat map created from communication environment information provided by each Vehicle of the vehicle fleet, velocity and location information for a particular vehicle, and relative rankings of one or more networks of control channel plane 130 indicated by the heat map to proactively compare the rankings of one or more networks within the particular vehicle's path of travel with the rankings of the vehicle's current network. If it is determined at block 502 that the network of control channel plane 130 currently used for providing the control channel is satisfactory (e.g., no network of the control channel plane better or substantially better meets one or more criteria relevant to the current situation with respect to the particular vehicle, no network of the control channel plane is ranked higher or significantly higher than the current network, etc.), processing according to the illustrated embodiment of flow 500 returns to block 501 for another iteration of operation to migrate a control channel. However, if it is determined at block 502 that a network of control channel plane 130 other than the network currently used for providing the control channel would be more satisfactory (e.g., a network of the control channel plane better or substantially better meets one or more criteria relevant to the current situation with respect to the particular vehicle, a network of the control channel plane is ranked higher or significantly higher than the current network, etc.), processing according to the illustrated embodiment of flow 500 proceeds to block 503 for processing to migrate the control channel and dynamically reassign it to another network of control channel plane 130 is performed. It should be appreciated that such migration of the control channel according to the illustrated embodiment is independent of use of the data network for communicating data content between the centralized mobility management platform and the vehicle and use of the security network for communicating security token information between the centralized mobility management platform and the vehicle.

At block 503 of the embodiment of flow 500 illustrated in FIG. 5, migration of the control channel from one network of control channel plane 130 to another network of control channel plane 130 (e.g., migration among the networks of the data network and the security network included in the control channel plane) is initiated. For example, centralized mobility management platform 120 may utilize the current control channel (e.g., using a network interface corresponding to the network of control channel plane 130 currently hosting the control channel) to signal an instance of IVS 200 hosted by the particular vehicle information regarding migrating the control channel to the selected network of control channel plane 130 (e.g., information identifying the selected network, establishing a timing for initiating the migration, etc.). Additionally or alternatively, centralized mobility management platform 120 may utilize a network interface corresponding to the selected network of control channel plane 130 to signal an instance of IVS 200 hosted by the particular vehicle (e.g., IVS 200 may periodically monitor networks of control channel plane 130 for control signals for migrating a control channel) information regarding migrating the control channel to the selected network of control channel plane 130 (e.g., information identifying the selected network, establishing a timing for initiating the migration, etc.). For example, after logic of centralized mobility management platform 120 has determined using a network heat map that a network within the particular vehicle's path of travel ranks higher than the vehicle's current network, centralized mobility management platform 120 may send a signal to the particular vehicle via the current network of the control channel plane 130 to prepare to switch over to the upcoming selected network of control channel plane 130. In operation according to embodiments, once the control channel has been migrated to the selected network of control channel plane 130, or the migration has been determined to have failed and the control channel is maintained using the prior network of the control channel plane, processing may return to block 501 for another iteration of operation to migrate a control channel.

It can be appreciated from the foregoing that operation according to the illustrated embodiment of flow 500 provides reliable and resilient control channels for communicating control information with onboard systems, and in particular ECUs, using a control channel plane supporting migration of a control channel for a vehicle among various in-band and out-of-band networks forming the control channel plane. Through establishing and dynamic migration of a control channel among the various in-band and out-of-band networks of the control channel plane, embodiments are able to resiliently and reliably provide command, control, and signaling communication between a centralized mobility management platform and vehicles of a fleet of vehicles. Moreover, the control channel may be continually migrated within the control channel plane to optimize maintaining the control channel within the control channel plane, such as in terms of cost, bandwidth, latency, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reliably maintaining a control channel between a vehicle of a fleet of vehicles and a centralized mobility management platform, the method comprising:
    using a data network comprising a plurality of data delivery networks for data content communication between the centralized mobility management platform and the vehicle of the fleet of vehicles;
    using a security network comprising one or more out-of-band networks with respect to the plurality of data delivery networks for security token communication between the centralized mobility management platform and the vehicle of the fleet of vehicles;

analyzing communication environment information provided by the vehicle and network utilization information available to the centralized mobility management platform to determine if migration of a control channel established between the centralized mobility management platform and the vehicle of the fleet of vehicles is indicated, wherein the analyzing is based on control channel migration rules that define a hierarchy of factors with respect to networks of the data network and the security network included in a control channel plane and is applied by logic of the centralized mobility management platform, and wherein the control channel plane includes at least one data delivery network of the data network and at least one out-of-band network of the security network; and migrating, based on results of the analyzing, the control channel among the networks of the data network and the security network included in the control channel plane, wherein migration of the control channel is independent of use of the data network for communicating data content between the centralized mobility management platform and the vehicle and use of the security network for communicating security token information between the centralized mobility management platform and the vehicle.

2. The method of claim 1, wherein factors of the hierarchy of factors comprise a plurality of factors selected from the group consisting of geographic coverage, cost, network availability, network resource set, network congestion, network latency, bandwidth, and quality.

3. The method of claim 1, wherein analyzing the communication environment information provided by the vehicle and network utilization information available to the centralized mobility management platform based on the hierarchy of factors further comprises:

ranking a plurality of networks of the control channel plane that are available to the vehicle based upon aspects of those networks meeting one or more threshold levels of factors of the hierarchy of factors, wherein the migrating the control channel is based on results of the ranking.

4. The method of claim 1, wherein the at least one data delivery network of the data network included in the control channel plane comprises an internet protocol network, and wherein the at least one out-of-band network of the security network included in the control channel plane comprises a wireless network established by a satellite constellation.

5. The method of claim 1, wherein the at least one data delivery network of the data network included in the control channel plane comprises a network selected from the group consisting of a cellular communication network, an Advanced Television Systems Committee (ATSC) data network, a wireless local area network, a Ku band geosynchronous satellite communications network, and a Ka band geosynchronous satellite communications network, and wherein the at least one out-of-band network of the security network included in the control channel plane comprises a L band low Earth orbit (LEO) satellite constellation communication network.

6. The method of claim 1, further comprising:
using the control channel to communicate the communication environment information from the vehicle to the centralized mobility management platform.

7. The method of claim 1, further comprising:

using the control channel to communicate data delivery network selection information to the vehicle for establishing data content communication between the centralized mobility management platform and the vehicle.

8. The method of claim 7, further comprising:
using the security network to communicate a security token to the vehicle for use by the vehicle in utilizing data content of the data content communication between the centralized mobility management platform and the vehicle.

9. The method of claim 1, further comprising:
scanning the at least one data delivery network of the data network and the at least one out-of-band network of the security network by the vehicle; and
reporting control channel plane network availability information from the vehicle to the centralized mobility management platform for operation by the centralized mobility management platform to establish the control channel.

10. The method of claim 9, wherein the scanning and reporting are performed by the vehicle when the vehicle is initialized for an operation session.

11. The method of claim 1, further comprising:
establishing the control channel by the centralized mobility management platform using the at least one out-of-band network of the security network.

12. The method of claim 11, wherein each data delivery network of the data network provide wireless communication service areas with narrower geographic coverage than wireless communication service areas provided by the at least one out-of-band network of the security network, and wherein control channel network selection rules implemented by the centralized mobility management platform establish the at least one out-of-band network of the security network as a fallback network for establishing the control channel.

13. The method of claim 11, wherein the establishing the control channel by the centralized mobility management platform using the at least one out-of-band network of the security network is performed when the control channel between the centralized mobility management platform and the vehicle has not been established and the centralized mobility management platform has control data for the vehicle.

14. The method of claim 11, wherein the establishing the control channel by the centralized mobility management platform using the at least one out-of-band network of the security network is performed when the control channel between the centralized mobility management platform and the vehicle has not been established and the vehicle has not reported control channel plane network availability information to the centralized mobility management platform within a predetermined period of time.

15. A system for reliably maintaining a control channel between a vehicle of a fleet of vehicles and a centralized mobility management platform, the system comprising:
at least one processor;
memory in data communication with the processor, wherein the memory includes instructions which when executed by one or more processors of the at least one processor provide logic that causes the one or more processors to:
use a data network comprising a plurality of data delivery networks for data content communication between the centralized mobility management platform and the vehicle of the fleet of vehicles;

use a security network comprising one or more out-of-band networks with respect to the plurality of data delivery networks for security token communication between the centralized mobility management platform and the vehicle of the fleet of vehicles;

analyze communication environment information provided by the vehicle and network utilization information available to the centralized mobility management platform to determine if migration of a control channel established between the centralized mobility management platform and the vehicle of the fleet of vehicles is indicated, wherein the analysis is based on control channel migration rules that define a hierarchy of factors with respect to networks of the data network and the security network included in a control channel plane and is applied by logic of the centralized mobility management platform, and wherein the control channel plane includes at least one data delivery network of the data network and at least one out-of-band network of the security network; and migrate, based on results of the analyzing, the control channel among networks of the data network and the security network included in the control channel plane, wherein migration of the control channel is independent of use of the data network for communicating data content between the centralized mobility management platform and the vehicle and use of the security network for communicating security token information between the centralized mobility management platform and the vehicle.

16. The system of claim 15, wherein factors of the hierarchy of factors comprise a plurality of factors selected from the group consisting of geographic coverage, cost, network availability, network resource set, network congestion, network latency, bandwidth, and quality.

17. The system of claim 15, wherein the logic further causes the one or more processors to:
rank a plurality of networks of the control channel plane that are available to the vehicle based upon aspects of those networks meeting one or more threshold levels of factors of the hierarchy of factors.

18. The system of claim 15, wherein the at least one data delivery network of the data network included in the control channel plane comprises an internet protocol network, and wherein the at least one out-of-band network of the security network included in the control channel plane comprises a wireless network established by a satellite constellation.

19. The system of claim 15, wherein the at least one data delivery network of the data network included in the control channel plane comprises a network selected from the group consisting of a cellular communication network, an Advanced Television Systems Committee (ATSC) data network, a wireless local area network, a Ku band geosynchronous satellite communications network, and a Ka band geosynchronous satellite communications network, and wherein the at least one out-of-band network of the security network included in the control channel plane comprises a L band low Earth orbit (LEO) satellite constellation communication network.

20. The system of claim 15, wherein the logic further causes the one or more processors to:
use the control channel to communicate the communication environment information from the vehicle to the centralized mobility management platform.

21. The system of claim 15, wherein the logic further causes the one or more processors to:

use the control channel to communicate data delivery network selection information to the vehicle for establishing data content communication between the centralized mobility management platform and the vehicle.

22. The system of claim 21, wherein the logic further causes the one or more processors to:
use the security network to communicate a security token to the vehicle for use by the vehicle in utilizing data content of the data content communication between the centralized mobility management platform and the vehicle.

23. The system of claim 15, wherein the logic further causes the one or more processors to:
scan the at least one data delivery network of the data network and the at least one out-of-band network of the security network by the vehicle; and
report control channel plane network availability information from the vehicle to the centralized mobility management platform for operation by the centralized mobility management platform to establish the control channel.

24. The system of claim 23, wherein scanning and reporting are performed by the vehicle when the vehicle is initialized for an operation session.

25. The system of claim 15, wherein the logic further causes the one or more processors to:
establish the control channel by the centralized mobility management platform using the at least one out-of-band network of the security network.

26. The system of claim 25, wherein each data delivery network of the data network provide wireless communication service areas with narrower geographic coverage than wireless communication service areas provided by the at least one out-of-band network of the security network, and wherein control channel network selection rules implemented by the centralized mobility management platform establish the at least one out-of-band network of the security network as a fallback network for establishing the control channel.

27. The system of claim 25, wherein establishing the control channel by the centralized mobility management platform using the at least one out-of-band network of the security network is performed when the control channel between the centralized mobility management platform and the vehicle has not been established and the centralized mobility management platform has control data for the vehicle.

28. The system of claim 25, wherein establishing the control channel by the centralized mobility management platform using the at least one out-of-band network of the security network is performed when the control channel between the centralized mobility management platform and the vehicle has not been established and the vehicle has not reported control channel plane network availability information to the centralized mobility management platform within a predetermined period of time.

29. A method for reliably maintaining a control channel between a vehicle of a fleet of vehicles and a centralized mobility management platform, the method comprising:
using a data network comprising a plurality of data delivery networks for data content communication between the centralized mobility management platform and the vehicle of the fleet of vehicles;
using a security network comprising one or more out-of-band networks with respect to the plurality of data delivery networks for security token communication between the centralized mobility management platform and the vehicle of the fleet of vehicles;

analyzing communication environment information provided by the vehicle and network utilization information available to the centralized mobility management platform based on a hierarchy of factors with respect to networks of a control channel plane for determining if control channel migration is indicated, wherein the control channel plane comprises a plurality of networks including at least one data delivery network of a data network and at least one security network of a security network; and migrating a control channel established between the centralized mobility management platform and the vehicle of the fleet of vehicles among networks of the control channel plane based on results of the analyzing, wherein migration of the control channel is independent of use of the data network for communicating data content between the centralized mobility management platform and the vehicle and use of the security network for communicating security token information between the centralized mobility management platform and the vehicle.

30. The method of claim 29, wherein factors of the hierarchy of factors comprise a plurality of factors selected from the group consisting of geographic coverage, cost, network availability, network resource set, network congestion, network latency, bandwidth, and quality.

31. The method of claim 29, wherein analyzing the communication environment information provided by the vehicle and network utilization information available to the centralized mobility management platform based on the hierarchy of factors further comprises:

ranking a plurality of networks of the control channel plane that are available to the vehicle based upon aspects of those networks meeting one or more threshold levels of factors of the hierarchy of factors, wherein the migrating the control channel is based on results of the ranking.

32. The method of claim 29, wherein the at least one data delivery network of the data network included in the control channel plane comprises an internet protocol network, and wherein the one or more out-of-band networks of the security network included in the control channel plane comprises a wireless network established by a satellite constellation.

33. The method of claim 29, wherein the at least one data delivery network of the data network included in the control channel plane comprises a network selected from the group consisting of a cellular communication network, an Advanced Television Systems Committee (ATSC) data network, a wireless local area network, a Ku band geosynchronous satellite communications network, and a Ka band geosynchronous satellite communications network, and wherein the one or more out-of-band networks of the security network included in the control channel plane comprises a L band low Earth orbit (LEO) satellite constellation communication network.

34. The method of claim 29, further comprising:

using the control channel to communicate the communication environment information from the vehicle to the centralized mobility management platform.

* * * * *

UNITED STATES PATENT AND TRADEMARK OFFICE
CERTIFICATE OF CORRECTION

PATENT NO. : 10,827,355 B2
APPLICATION NO. : 15/857212
DATED : November 3, 2020
INVENTOR(S) : Panayotis Lekkas et al.

Page 1 of 1

It is certified that error appears in the above-identified patent and that said Letters Patent is hereby corrected as shown below:

In the Specification

At Column 2, Line number 15, delete "UNSTAR™" and replace with --ONSTAR™--.
At Column 2, Line number 55, delete "data network at least one" and replace with --data network (i.e., at least one--.
At Column 4, Line number 44, delete "same, purposes" and replace with --same purposes--.
At Column 6, Line number 41, delete "150-454" and replace with --150-154--.
At Column 7, Line number 15, delete "(MONO) networks, UHF ASC" and replace with --(MVNO) networks, UHF ATSC--.
At Column 7, Line number 25, delete "IEEE 802.15.4, Bluetooth" and replace with --IEEE 802.15.4, Wi-Fi, Bluetooth--.
At Column 8, Line number 36, delete "network 140, Moreover" and replace with --network 140. Moreover--.
At Column 11, Line number 67, delete "150-454" and replace with --150-154--.
At Column 13, Line number 49, delete "UPS navigation" and replace with --GPS navigation--.
At Column 14, starting at Line number 60, delete "by 200" and replace with --by IVS 200--.
At Column 17, Line number 51, delete "platform 20" and replace with --platform 120--.
At Column 21, Line number 33, delete "UPS" and replace with --GPS--.
At Column 21, Line number 52, delete "Whether" and replace with --whether--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*